US007232213B2

(12) United States Patent
Smith et al.

(10) Patent No.: US 7,232,213 B2
(45) Date of Patent: Jun. 19, 2007

(54) INK-JET PRINTED RIGID INTERLAYER AND A PROCESS FOR PREPARING SAME

(75) Inventors: Rebecca L. Smith, Vienna, WV (US); Hamdy Elwakil, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 164 days.

(21) Appl. No.: 10/519,655

(22) PCT Filed: Jul. 31, 2003

(86) PCT No.: PCT/US03/24116

§ 371 (c)(1),
(2), (4) Date: Dec. 27, 2004

(87) PCT Pub. No.: WO2004/011271

PCT Pub. Date: Feb. 5, 2004

(65) Prior Publication Data

US 2005/0285920 A1    Dec. 29, 2005

Related U.S. Application Data

(60) Provisional application No. 60/400,232, filed on Jul. 31, 2002.

(51) Int. Cl.
B41J 2/01 (2006.01)
(52) U.S. Cl. ........................ 347/105; 347/101; 428/32.1
(58) Field of Classification Search ................ 347/105, 347/101, 95, 96, 100; 428/195, 32.1
See application file for complete search history.

(56) References Cited

U.S. PATENT DOCUMENTS

| | | |
|---|---|---|
| 4,303,718 A | 12/1981 | Snelgrove |
| 4,868,581 A | 9/1989 | Mouri et al. |
| 4,968,553 A | 11/1990 | Cesar |
| 5,455,103 A | 10/1995 | Hoagland et al. |
| 5,914,178 A | 6/1999 | Sol et al. |
| 6,013,330 A | 1/2000 | Lutz |
| 6,099,415 A | 8/2000 | Lutz |
| 6,248,804 B1 | 6/2001 | Lutz |
| 6,432,519 B1 | 8/2002 | Kazama et al. |
| 6,596,067 B2 | 7/2003 | Menzel et al. |
| 7,041,163 B2 | 5/2006 | Roman et al. |
| 7,122,077 B2 | 10/2006 | Bauer et al. |
| 2002/0009553 A1 | 1/2002 | Lutz |
| 2002/0055006 A1 | 5/2002 | Vogel et al. |
| 2003/0049415 A1 | 3/2003 | Pedginski et al. |
| 2003/0124296 A1 | 7/2003 | Smith |
| 2004/0234735 A1 | 11/2004 | Reynolds et al. |
| 2005/0048229 A1 | 3/2005 | Elwakil et al. |
| 2005/0118401 A1 | 6/2005 | Smith et al. |
| 2005/0234185 A1 | 10/2005 | Smith et al. |
| 2005/0271865 A1 | 12/2005 | Elwakil et al. |

FOREIGN PATENT DOCUMENTS

| | | |
|---|---|---|
| DE | 29706880 U1 | 7/1997 |
| DE | 20100717 U1 | 5/2001 |
| EP | 0 254 187 A2 | 1/1988 |
| EP | 1 114 734 A1 | 7/2001 |
| EP | 1114734 A1 * | 7/2001 |
| EP | 1129844 A1 | 9/2001 |
| JP | 2000355163 | 12/2000 |
| WO | WO 99/58334 | 11/1999 |
| WO | WO 02/18154 A1 | 3/2002 |
| WO | WO 2005/014280 A1 | 2/2005 |

OTHER PUBLICATIONS

PCT International Search Report and Written Opinion for International application No. PCT/US2004/025884, dated Dec. 3, 2004.
PCT International Search Report from countrerpart International application No. PCT/US03/24116, dated Dec. 18, 20003.
PCT Written Opinion from counterpart International application No. PCT/US03/24116, dated May 28, 2004.
PCT International Preliminary Examination Report from counterpart International application No. PCT/US03/24116, dated Oct. 5, 2004.

* cited by examiner

Primary Examiner—Manish S. Shah
(74) Attorney, Agent, or Firm—Kevin S. Dobson

(57) ABSTRACT

The present invention is a decorative glass laminate comprising a rigid interlayer bearing a printed image that has been ink-jetted onto at least one of the interlayer surfaces, and a process for preparing same. The interlayer has a storage young's modulus of 50–1000 Mla at 0.3 Hz and 25 C, as determined according to ASTM D 5026-95a and a finite thickness of less than equal to about 0.38 mm.

26 Claims, No Drawings

INK-JET PRINTED RIGID INTERLAYER AND A PROCESS FOR PREPARING SAME

This Application claims the benefit of U.S. Provisional Application No. 60/400,232, filed Jul. 31, 2002.

BACKGROUND OF THE INVENTION

Laminated safety glass consists of two lites of glass joined by an energy absorbing plastic interlayer, typically polyvinylbutyral (PVB). Laminated safety glass is used in automotive windshields and in architectural building glass. Architects are continually using glass in more demanding applications such as balustrades, partitions, floors, doors, and overhead bolted glass. Laminated safety glass using plasticized PVB as the interlayer typically does not meet the strength or post glass breakage requirements for these applications. Ionomers of ethylene/methyacrylic acid copolymers (sold under the DuPont tradename Surlyn®) yield interlayer materials that are rigid, much stiffer and tougher than traditional PVB interlayers. Laminated safety glass utilizing stiffer, tougher interlayer has been shown to possess the strength and post glass breakage requirements needed for these demanding architectural applications.

In addition, it has been found that interlayers of ionomeric ethylene/methyacrylic acid copolymers demonstrate much improved edge stability over traditional PVB interlayers. This improved edge stability allows for laminated glass (with interlayers of ionomeric ethylene/methyacrylic acid copolymers) to be used in applications such as shower doors and exterior open edge applications where traditional laminated glass (with PVB interlayers) would not be used. In many of these above-mentioned applications (balustrades, partitions, floors, doors, overhead bolted glass, and shower doors) it would be desirable to have a decorative image in the laminated safety glass.

Processes for making laminated decorative glass have been disclosed in WO 02/18154A1, DE 29706880, U.S. Pat. No. 4,968,553, U.S. Pat. No. 5,914,178, EP 1129844A1, and DE 20100717. These decorative laminates use PVB, PVB/PET/PVB composites, or EVA (ethylene/vinyl acetate copolymers) as the interlayer. While the resulting decorative safety glass laminates may meet the architectural safety codes, these laminates may not perform well in demanding applications such as those outlined above.

Further many of these references disclose a process for making decorative laminated glass via a silk screening process DE 29706880, U.S. Pat. No. 4,968,553, U.S Pat. No. 5,914,178, EP 1129844A1, and DE20100717). Silk-screening an image onto an interlayer is a very time-consuming and expensive process for making decorative laminated safety glass. Inkjet technology is very flexible; any digital image can be printed onto the substrate. Using ink jet technology to print on flexible interlayers (PVB and polynrethanes) for laminated safety glass has been disclosed in WO 0218154. Several disadvantages of ink jet printing directly on PVB include the fact that all PVB interlayers have a roughened surface pattern (Rz from 30–60 μm), which is present to allow for air to escape during the lamination process as described in U.S. Pat. No. 5,455,103. The rough surface pattern can effect image quality with respect to mottle and resolution. Also, polyvinyl butyral is a viscoelastic polymer, which can lead to poor dimensional stability in the image-bearing interlayer.

Interlayers obtained from an ionomer of an ethylene/methyacrylic acid copolymer are stiff relative to other conventional interlayers, and can have improved dimensional stability relative to PVB, for example. However, the Applicants have found that one problem with printing on a stiff material is that a stiff polymer is not amenable to conventional printing processes. The Applicants have found that the process of ink jet printing on a conventional ionomeric interlayer using a conventional ink jet printer is problematical because an ionomer of ethylene/methyacrylic acid copolymer is not flexible enough to be fed through the ink jet printers.

SUMMARY OF THE INVENTION

In one aspect, the present invention is a process for ink-jet printing an image onto a rigid thermoplastic interlayer comprising the step: feeding a rigid interlayer sheet through an ink jet printer and ink-jet printing an image on the sheet, wherein the interlayer has a Storage Young's Modulus of 50–1,000 MPa (mega Pascals) at 0.3 Hz and 25° C., as determined according to ASTM D 5026-95a, and wherein the rigid interlayer sheet has a finite thickness of less than or equal to about 0.38 mm. Preferably the interlayer is either an ethylene/(meth)acrylic acid copolymer ionomer or PVB comprising plasticizer in an amount of less than 30 parts per hundred parts based on the weight of the interlayer sheet. More preferably the interlayer is an ethylene/(meth)acrylic acid copolymer ionomer.

In a preferred embodiment, the process further comprises the step of laminating the image-bearing interlayer sheet with a second interlayer sheet which is non-image bearing, to form a composite image-bearing interlayer, wherein the total thickness of the composite interlayer is in the range of from about 0.40 mm to about 2.29. Preferably the image-bearing surface of the rigid interlayer is the surface that is in contact with the surface of the second interlayer sheet. Preferably the second interlayer sheet is an ethylene/(meth)acrylic acid copolymer ionomer. Preferably the second interlayer sheet has a thickness of from about 0.76 mm to about 1.13 mm.

In another aspect the present invention is thermoplastic interlayer sheet bearing an image on at least one surface of the interlayer sheet the image being printed on the sheet by a process comprising the step: feeding a rigid interlayer sheet through an ink jet printer and ink-jet printing an image on the sheet, wherein the interlayer has a Storage Young's Modulus of 50–1,000 MPa (mega Pascals) at 0.3 Hz and 25° C., as determined according to ASTM D 5026-95a, and wherein the rigid interlayer sheet has a finite thickness of less than or equal to about 0.38 mm. Preferably the interlayer has a surface roughness of from about 5 μm to about 15 μm. Preferably the size of the image does not change by more than +1% of the initial size of the image after drying at 60° C. for 30 minutes after the image is printed.

In still another aspect the present invention is a decorative glass laminate comprising at least two sheets of glass having disposed therebetween a rigid image-bearing interlayer sheet wherein the image bearing interlayer was obtained by a process comprising the steps of: (1) "ink jet" printing pigmented ink onto at least one surface of an interlayer sheet which is a rigid ethylene/methylacrylic acid copolymer ionomer having a thickness of less than or equal to about 0.38 mm and wherein the interlayer has a Storage Young's Modulus of 50–1,000 MPa (mega Pascals) at 0.3 Hz and 25C., as determined according to ASTM D 5026-95a, to obtain an image-bearing interlayer sheet; and (2) laminating the image-bearing interlayer sheet between sheets of transparent materials to obtain a decorative laminate. Preferably the rigid interlayer comprises a roughened surface having a roughness ($R_z$) of from about 5 µm to about 15 µm prior to lamination.

Preferably the rigid image-bearing interlayer is laminated with one or more other interlayer sheets to yield a composite interlayer having a total thickness of from about 0.40 mm to about 2.29 mm. Preferably the other interlayer comprises a thermoplastic polymer selected from polymers in the group consisting of: PVB; PET; PUR; PC; PVC; of ethylene/(meth)acrylic acid copolymer ionomers; ethylene/(meth) acrylic acid/alkyl acrylates terpolymers.

In a preferred embodiment, the image is printed using a drop on demand (DOD) ink jet printing process. In one preferred embodiment the DOD process is a piezo electric process. In another preferred embodiment, the DOD process is a thermal ink jet printing process.

In another preferred embodiment, the image is printed using a continuous drop ink jet printing process.

The invention is also directed to a decorative laminate obtained by the process. Preferably the image-bearing interlayer is laminated with at least one additional sheet of at least one other interlayer to produce a composite image-bearing interlayer. wherein the at least one additional interlayer sheet has a thickness sufficient to such that the total thickness of the composite interlayer falls within a range of from about 0.40 mm to about 2.29 mm, and wherein the composite image-bearing interlayer is further laminated with at least one sheet of glass.

DETAILED DESCRIPTION OF THE INVENTION

In one embodiment, this invention is a method for printing a decorative image on a rigid interlayer. A rigid interlayer suitable for use in the practice of the present invention preferably has a Storage Young's Modulus of 50–1,000 MPa (mega Pascals) at 0.3 Hz and 25° C., as determined according to ASTM D 5026-95a. Conventional interlayer materials, such as conventionally plasticized PVB, do not typically have a modulus in this range. Other conventional interlayer materials can be suitable as a substrate for ink-jet printing, but there are advantages in using a rigid interlayer material.

Rigid, stiff Interlayers, such as those based upon ionomeric ethylene/methyacrylic acid copolymers, facilitate using a much smoother surface pattern to obtain acceptable deairing during lamination since the surface pattern does not break down as rapidly with a rigid interlayer. For example, a desirable range of Rz for laminating conventionally plasticized (flexible) PVB is 30–60 µm while an acceptable range of Rz for stiff interlayers is from 5 to 15 µm. The smooth surface pattern for the ionomeric interlayer yields printed images with higher resolution and less mottle than images printed directly on PVB.

The higher modulus of a rigid interlayer relative to other conventional flexible interlayer materials, such as flexible PVB, can yield an interlayer that has improved dimensional stability versus more flexible materials. The improved dimensional stability can improve the image stability of the image-bearing product, and make the entire process more reliable and reproducible with respect to elongation or shrinkage of the image.

Printing on a rigid interlayer to obtain an image-bearing rigid with either can be accomplished using either an aqueous or solvent based ink and by using ink jet printing technology and laminating the image bearing rigid interlayer between two lites of glass or other transparent materials. Laminates obtained in this manner have acceptable adhesion for safety glass applications.

In a preferred embodiment, the image is printed onto the interlayer using an inkjet printer equipped with a piezoelectric drop on demand printhead such as Spectra or Xaar and the inkjet printer is chosen so that the rigid interlayer is held on a bed type support.

The interlayer can be any clear, transparent rigid thermoplastic material that can be adhesively bonded to glass. The interlayer, for example, can be a PVB sheet having less than 30 parts of plasticizer, or an ionomeric interlayer. The interlayer is preferably an ionomer of an ethylene/(meth)acrylic acid copolymer where the surface roughness (Rz) of the sheet is between 5 and 15 µm and the total thickness of the interlayer is between 0.38–2.29 mm.

The term "ethylene/(meth)acrylic acid" as used herein is a shorthand term that denotes a copolymer that comprises either ethylene and acrylic acid units or ethylene and methacrylic acid units. Ionomers are known conventionally as partially neutralized ethylene/(meth)acrylic acid copolymers. A suitable interlayer for printing according to the practice of the present invention can be obtained from an ethylene/acrylic acid copolymer ionomer, such as those commercially available from E.I. DuPont de Nemours and Company, for example.

In another embodiment, the present invention is a composite image-bearing interlayer which can be obtained by a process comprising the step of feeding a thin substrate film having Storage Young's Modulus of 50–1,000 MPa at 0.3 Hz and 25° C., as determined according to ASTM D 5026-95a, and having a finite thickness less than or equal to about 0.38 mm, through a conventional ink jet printer and ink-jet printing an image onto the surface of the substrate film, and then laminating the image-bearing thin film with a second sheet of a thermoplastic interlayer material. The composite printed interlayer preferably has a thickness of from about 0.40 to about 2.29 mm. The thickness of the other sheets can vary, but should be at least 0.025 mm thick. The other sheets can be blank, bear printed images or colors, can be transparent, semi-transparent, opaque or can otherwise be visually distinct from the printing substrate. In a preferred embodiment the thin printing substrate can be laminated with a thicker ($\geq 0.76$ mm) film or sheet of, for example, an ionomer of an ethylene/methylacrylic acid copolymer to achieve the desired structural properties in the finished laminate. Lamination of the image-bearing interlayer sheet with a thicker polymer sheet yields a product having an image imprinted on the interlayer and also having the properties of a thicker interlayer.

The other sheet can be any thermoplastic interlayer material that can be adhesively bonded to the printed ionomer film. For example, the thicker film can be: an ethylene copolymer and/or terpolymer such as ethylene/acrylic acid or ethylene/alkyl acrylate copolymers and ethylene/acrylic acid/alkyl acrylate terpolymers; a polyacetal; a polyvinylbutyral; a polyurethane; a polyvinyl chloride; or, a polyester.

Preferably the thin printing substrate film has a thickness in the range of from about 0.025 mm to about 0.45 mm. More preferably, the thickness of the printing substrate is from about 0.1 mm to about 0.40 mm. Most preferably, the thickness of the printing substrate is from about 0.25 mm to about 0.38 mm. The thicker film sheet preferably has a thickness which is complimentary to the thickness of the thin film such that the total thickness of the interlayer sheets is in the range of from about 0.38 mm to about 2.29 mm. More preferably, the total thickness is in the range of from about 0.60 mm to about 1.75 mm. Most preferably, the total thickness of the interlayer is from about 1.14 mm to about 1.52 mm.

Laminates of the present invention can be used in any application wherein conventional (that is, non-decorative) laminated glass is used. In addition to the conventional uses as safety glass, however, the laminates of the present invention can be used as decorative articles such as picture windows, decorative countertops, graphic art, image-bearing store-front windows, displays bearing company logos, advertising media, and/or any other use wherein a transparent laminate bearing an image can be desirable.

Preferable inks for use in the practice of the present invention are those that provide printed images having a satisfactory combination of image quality, light fastness, and weatherability. Further, laminates that incorporate image-bearing interlayers of the present invention should have the adhesion properties that are acceptable in the various applications in which they will be used. Due to the nature of the polymeric interlayer substrates used herein for printing, and the requirements for adhesion in a safety glass, choice of a suitable ink is not problem free. An ink suitable for use in the practice of the present invention must also be compatible with the substrate to give satisfactory results.

Printing heads useful for piezo electric processes are available from, for example, Epson, Seiko-Epson, Spectra, XAAR and XAAR-Hitachi. Printing heads useful for thermal ink jet printing are available from, for example, Hewlett-Packard and Canon. Printing heads suitable for continuous drop printing are available from Iris and Video Jet, for example.

Optionally included in an ink system suitable for use in the practice of the present invention is a binder resin. A binder resin can be preferable to improve adhesion between the ink and the laminate substrate. Suitable binders for use in the practice of the present invention can include polyvinyl pyrilidone/vinyl acetate (PVP/VA), polyvinyl pyrilidone (PVP), and PUR, for example. Mixtures of binder resins can also be useful in the practice of the present invention. Other binders are conventionally known and can be useful herein.

EXAMPLES

The following examples are presented to illustrate the invention. The examples are not intended to limit the scope of the invention in any manner.

Test Methods

Surface Roughness, Rz, is determined from the 10 point average roughness as described in ISO-R468 and is expressed in microns. Surface roughness is measured using a Mahr Federal (Providence, R.I.) surfanalyzer.

Dimensional Stability Test: The dimensional stability test involves printing an image of known size onto the substrate of interest. The size of the printed image exit the printer is compared to that of the digital input.

Example

An image of 100 mm×100 mm in size was printed onto a 0.38 mm thick interlayer of an ionomeric copolymer of ethylene/methacrylic acid. Immediately after printing at ambient conditions, the image was determined to be exactly 100 mm×100 mm. After the image was allowed to dry at 60° C. for 30 minutes, the image size was 100 mm×100 mm. The shrinkage for the ionomeric copolymer of ethylene/methacrylic acid was determined to be 0%.

Comparitive Example

An image of 300 mm×300 mm size was printed onto 0.76 mm PVB. Immediately after printing at ambient conditions, the image was determined to be 302 mm×298 mm. After the image was allowed to dry at 60° C. for 30 minutes, the image size was determined to be 304 mm×294 mm. The shrinkage for 0.76 mm PVB was determined to be 2%.

Lamination Procedure:

An image was printed onto the surface of each of the subject interlayers in the following examples via an ink-jet printer. Prior to lamination of the image-bearing interlayers, the interlayers were dried to less than 0.2% $H_2O$ using a 75° C. oven for a minimum of 16 hours. For lamination, a layer of 15 mil blank (non-image-bearing) interlayer was placed on the image-bearing surface. The multi-layered structure was deaired (by either a vacuum bag or nip roll process) and autoclaved using standard lamination conditions.

Example 1

A solid yellow color block was printed onto the surface of a 0.38 mm thick interlayer of an ionomer of ethylene/methylacrylic acid copolymer using an Epson 3000 printer. The ink used is described in the table below. The printed interlayer was laminated as described above.

| | |
|---|---|
| Dispersion | Acrylic polymer |
| | Pigment Yellow 120 |
| | Dipropylene glycol monomethyl ether |
| Binder | Khrumbhaar 1717 |
| Solvents | Dipropylene glycol methyl ether acetate |
| | Dipropylene glycol propyl ether |

Example 2

A solid yellow color block was printed and laminated as described in Example 1. The ink used is described in the table below.

| | |
|---|---|
| Dispersion | Acrylic polymer |
| | Pigment Yellow 120 |
| | Dipropylene glycol monomethyl ether |
| Binder | Khrumbhaar 3107 |
| Solvents | Dipropylene glycol methyl ether acetate |
| | Dipropylene glycol propyl ether |

Example 3

A solid yellow color block was printed and laminated as described in Example 1. The ink used is described in the table below.

| | |
|---|---|
| Dispersion | Acrylic polymer |
| | Pigment Yellow 120 |
| | Dipropylene glycol monomethyl ether |
| Binder | Khrumbhaar 1728 |
| Solvents | Dipropylene glycol methyl ether acetate |
| | Dipropylene glycol propyl ether |

Example 4

A solid yellow color block was printed and laminated as described in Example 1. The ink used is described in the table below.

| | |
|---|---|
| Dispersion | Acrylic polymer |
| | Pigment Yellow 120 |
| | Dipropylene glycol monomethyl ether |
| Binder | Laropal 80 |
| Solvents | Dipropylene glycol methyl ether acetate |
| | Dipropylene glycol propyl ether |

Example 5

A solid yellow color block was printed and laminated as described in Example 1. The ink used is described in the table below.

| | |
|---|---|
| Dispersion | Acrylic polymer |
| | Pigment Yellow 120 |
| | Dipropylene glycol monomethyl ether |
| Binder | Laropal 81 |
| Solvents | Dipropylene glycol methyl ether acetate |
| | Dipropylene glycol propyl ether |

Example 6

A solid yellow color block was printed and laminated as described in Example 1. The ink used is described in the table below.

| | |
|---|---|
| Dispersion | Acrylic polymer |
| | Pigment Yellow 120 |
| | Dipropylene glycol monomethyl ether |
| Binder | Laropal A101 |
| Solvents | Dipropylene glycol methyl ether acetate |
| | Dipropylene glycol propyl ether |

What is claimed is:

1. A process for ink-jet printing an image onto a rigid thermoplastic interlayer comprising the steps: (a) feeding a rigid interlayer sheet through an ink jet printer and (b) ink-jet printing an image on the rigid interlayer sheet, (i) wherein the rigid interlayer sheet has a Storage Young's Modulus of 50–1,000 MPa (mega Pascals) at 0.3 Hz and 25° C., as determined according to ASTM D 5026-95a, (ii) wherein the rigid interlayer sheet is selected from the group consisting of (A) ethylene/(meth)acrylic acid copolymer ionomer sheets or (B) polyvinyl butyral sheets comprising plasticizer in an amount of less than 30 parts per hundred parts based on the weight of the rigid interlayer sheet and (iii) wherein the rigid interlayer sheet has a thickness of about 0.025 mm to about 0.45 mm.

2. The process of claim 1 wherein the rigid interlayer sheet is the polyvinyl butyral.

3. The process of claim 2 wherein the rigid interlayer sheet is the ethylene/(meth)acrylic acid copolymer ionomer sheet.

4. The process of claim 3 further comprising the step of laminating the image-bearing rigid interlayer sheet with a second interlayer sheet which is non-image bearing, to form a composite image-bearing interlayer, wherein the total thickness of the composite image-bearing interlayer is in the range of from about 0.40 mm to about 2.29 mm.

5. The process of claim 4 wherein the image-bearing surface of the rigid interlayer sheet is the surface that is in contact with the surface of the second interlayer sheet.

6. The process of claim 5 wherein the second interlayer sheet is an ethylene/(meth)acrylic acid copolymer ionomer sheet.

7. The process of claim 6 wherein the second interlayer sheet has a thickness of from about 0.76 mm to about 1.13 mm.

8. The process of claim 1 wherein the image is printed using a drop on demand ink jet printing process.

9. The process of claim 8 wherein the drop on demand process is a thermal electric process.

10. The process of claim 8 wherein the drop on demand process is a thermal ink jet printing process.

11. A rigid thermoplastic interlayer bearing an image on at least one of its surfaces prepared by the process of claim 1.

12. The rigid thermoplastic interlayer of claim 11 wherein the rigid thermoplastic interlayer has a surface roughness of from about 5 μm to about 15 μm.

13. The process of claim 1 wherein the rigid thermoplastic interlayer has a surface roughness of from about 5 μm to about 15 μm and wherein the size of the image does not change by more than +1% of the initial size of the image after drying at 60° C. for 30 minutes after the image is printed.

14. The process of claim 1 wherein the ink-jet printing the image is carried out using pigmented ink.

15. A process for obtaining a decorative laminate comprising the steps: (1) "ink jet" printing pigmented ink onto at least one surface of a rigid ethylene/methyacrylic acid copolymer ionomer interlayer sheet having a thickness of about 0.025 mm to about 0.45 mm and wherein the interlayer sheet has a Storage Young's Modulus of 50–1,000 MPa (mega Pascals) at 0.3 Hz and 25° C., as determined according to ASTM D 5026-95a, to obtain an image-bearing interlayer sheet; and (2) laminating the image-bearing interlayer sheet between sheets of transparent materials to obtain a decorative laminate.

16. The process of claim 15 wherein the rigid interlayer comprises a roughened surface having a roughness ($R_z$) of from about 5 μm to about 15 μm prior to lamination.

17. The process of claim 16 wherein the rigid image-bearing interlayer is laminated with one or more other interlayer sheets to yield a composite interlayer having a total thickness of from about 0.40 mm to about 2.29 mm.

18. The process of claim 17 wherein the other interlayer comprises a thermoplastic polymer selected from polymers in the group consisting of: polyvinyl butyral; polyurethane; ethylene/(meth)acrylic acid copolymer ionomers; and ethylene/(meth)acrylic acid/alkyl acrylate terpolymers.

19. The process of claim 18 wherein the image is printed using a continuous drop ink jet printing process.

20. A decorative laminate obtained by the process of claim 15.

21. The laminate of claim 20 wherein the image-bearing interlayer is laminated with at least one additional sheet of at least one other interlayer to produce a composite image-bearing interlayer, wherein the at least one additional interlayer sheet has a thickness sufficient to such that the total thickness of the composite interlayer falls within a range of from about 0.40 mm to about 2.29 mm, and wherein the sheets of transparent materials are glass lites.

22. The process of claim 15 wherein the sheets of transparent materials are glass lites.

23. A process of forming a glass laminate comprising:
(a) ink-jet printing an image with pigmented ink on a rigid ethylene/(meth)acrylic acid copolymer ionomer interlayer sheet having (i) a thickness of about 0.025 mm to about 0.45 mm, and (ii) a Storage Young's Modulus of 50–1,000 MPa (mega Pascals) at 0.3 Hz and 25° C., as determined according to ASTM D 5026-95a, using an ink jet printer to obtain an image-bearing interlayer sheet, and
(b) laminating the image-bearing interlayer sheet to two glass lites.

24. The process of claim 23 wherein the ethylene/(meth)acrylic acid copolymer ionomer interlayer sheet has a surface roughness (Rz) between 5 and 15 μm.

25. A process of forming a glass laminate comprising:
(a) ink-jet printing an image with pigmented ink on a rigid polyvinyl butyral interlayer sheet having (i) a thickness of about 0.025 mm to about 0.45 mm, and (ii) a Storage Young's Modulus of 50–1,000 MPa (mega Pascals) at 0.3 Hz and 25° C., as determined according to ASTM D 5026-95a, using an ink jet printer to obtain an image-bearing interlayer sheet, wherein the polyvinyl butyral interlayer sheet comprises plasticizer in an amount of less than 30 parts per hundred parts based on the weight of the polyvinyl interlayer sheet, and
(b) laminating the image-bearing interlayer sheet to two glass lites.

26. A process of forming a glass laminate comprising:
(a) ink-jet printing an image with pigmented ink on a rigid ethylene/(meth)acrylic acid copolymer ionomer interlayer sheet having (i) a thickness of about 0.025 mm to about 0.45 mm, and (ii) a Storage Young's Modulus of 50–1,000 MPa (mega Pascals) at 0.3 Hz and 25° C., as determined according to ASTM D 5026-95a, using an ink jet printer to obtain an image-bearing interlayer sheet,
(b) providing at least one additional ethylene/(meth)acrylic acid copolymer ionomer interlayer sheet, and
(c) laminating the image-bearing interlayer sheet and the at least one additional (meth)acrylic acid copolymer ionomer interlayer sheet between two glass lites.

* * * * *

UNITED STATES PATENT AND TRADEMARK OFFICE
CERTIFICATE OF CORRECTION

PATENT NO.        : 7,232,213 B2                                     Page 1 of 1
APPLICATION NO.   : 10/519655
DATED             : June 19, 2007
INVENTOR(S)       : Rebecca L. Smith and Hamdy A. Elwakil It is certified that error appears in the above-identified patent and that said Letters Patent is hereby corrected as shown below:

Claim 2, Column 7, - add --sheet-- so line reads: --sheet is the polyvinyl butyral sheet--.

Claim 9, Column 8, Line 17 - delete "thermal" and add --piezo-- - so line reads: --process is a [thermal] --piez-- electric process--.

Claim 13, Column 8, Line 29 - delete "+" and add --±-- so line reads: --change by more than [+] --±--1% of the initial size of the image--

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,232,213 B2
APPLICATION NO. : 10/519655
DATED : June 19, 2007
INVENTOR(S) : Rebecca L. Smith and Hamdy A. Elwakil It is certified that error appears in the above-identified patent and that said Letters Patent is hereby corrected as shown below:

Claim 2, Column 7, line 61, - add --sheet-- so line reads: --sheet is the polyvinyl butyral sheet--.

Claim 9, Column 8, Line 17 - delete "thermal" and add --piezo-- - so line reads: --process is a [thermal] --piez-- electric process--.

Claim 13, Column 8, Line 29 - delete "+" and add --±-- so line reads: --change by more than [+] --±--1% of the initial size of the image--.

This certificate supersedes the Certificate of Correction issued August 12, 2008.

Signed and Sealed this

Sixteenth Day of September, 2008

JON W. DUDAS
*Director of the United States Patent and Trademark Office*